April 15, 1958 A. H. FAULKNER 2,831,064
LINE CIRCUIT USING TRANSISTORS
Filed March 16, 1955
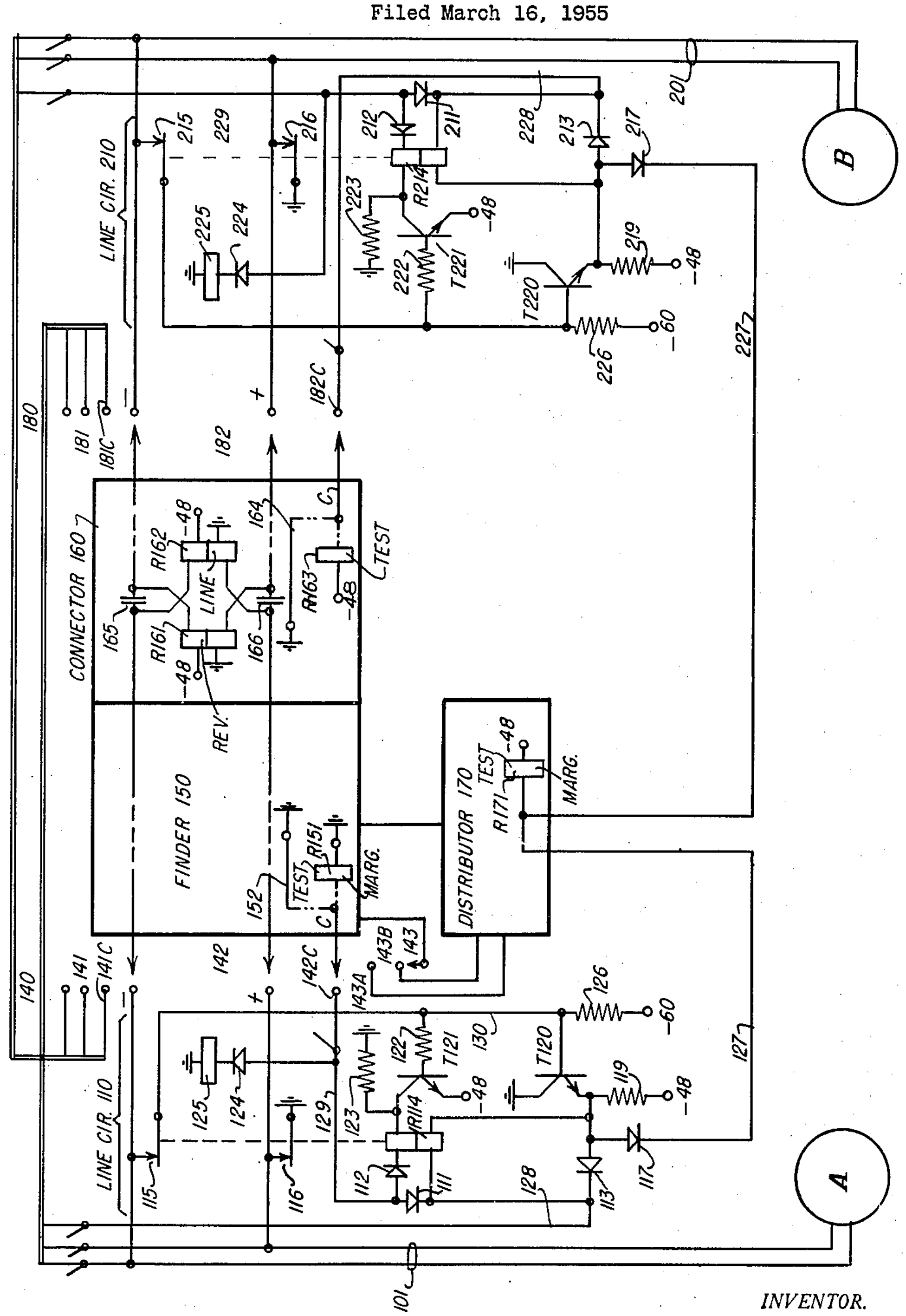
INVENTOR.
Alfred H Faulkner
BY Smith, Olsen, Baird and Gulbrandsen.
Attys.

United States Patent Office 2,831,064

Patented Apr. 15, 1958

2,831,064

LINE CIRCUIT USING TRANSISTORS

Alfred H. Faulkner, Chicago, Ill., assignor to General Telephone Laboratories, Incorporated, a corporation of Delaware Application March 16, 1955, Serial No. 494,636

13 Claims. (Cl. 179—18)

This invention relates to automatic telephone systems and particularly to electronically controlled line circuits for such systems.

The development of small compact current control devices, and particularly the development of such devices having low power requirements, has provided new means for performing switching functions which appear to be particularly well adapted for use in automatic telephone systems. Specifically, new developments in the transistor field have provided current flow devices having characteristics which may be utilized in automatic telephone switching to effect more efficient and less expensive telephone service.

It is an object of this invention to provide an improved line circuit in which switching functions are accomplished through the use of semi-conductor devices.

Another object of the invention is to provide an improved line circuit utilizing transistors and diodes to perform switching operations.

Further features of the invention pertain to the particular arrangement of the circuit elements in the telephone system and the line circuit whereby the above outlined operating features are attained.

The invention, both as to its organization and method of operation, together with further objects and advantages thereof, will be best understood by reference to the following specification and the accompanying drawing, forming a part thereof, wherein the single figure illustrates the details of an automatic telephone system provided with a line circuit using transistors and poled diodes in accordance with the present invention.

Referring specifically to the drawing, there is illustrated an automatic telephone system comprising an exchange serving a number of subscriber lines including the subscriber line 101 extending to the subscriber station A and a subscriber line 201 extending to subscriber station B. The respective lines may be private or party lines wherein the stations thereof are comprised of conventional station apparatus adapted to be rung by any conventional means including harmonic or code means. Each of the lines 101 and 201 is provided with a line circuit 110 and 210 respectively individual thereto and identical in circuit construction.

In addition, the system comprises a distributor 170 of a conventional type operatively associated with the line circuits 110 and 210 and with a plurality of finder-connector link circuits. One of the links is illustrated and comprises the finder 150 and the connector 160 shown in box schematic form and which may be of any suitable type, although preferably of the Strowger type. Thus, as shown, the finder 150 includes Strowger mechanism 140 comprising line and contact wipers and a contact set bank. The contact set bank includes a plurality of contact sets arranged in vertical levels and in horizontal rows in each level and the contact sets are adapted to individually receive the wipers. Two contact sets 141 and 142 are illustrated. Each contact set is connected to an individual subscriber line and to the respective line circuit and includes a negative line contact, a positive line contact and a control contact. In addition the finder 150 includes a vertical level control mechanism 143 having a wiper particularly connected to the finder 150 and vertically arranged contacts equal in number to the levels in the contact bank, each vertical contact of which is connected to the line circuits common to the contact sets in one level of the contact bank.

The line finder 150 further includes a test relay R151 of the marginal type wherein a winding thereof is connected between the control wiper and ground potential. Upon being operated by the distributor, the wipers of the line finder search through the contact sets of the contact bank 142 for a control contact marked at the negative battery potential (—48 volts) which indicates that the line associated with the contact set is calling. The test relay operates upon seizure of the calling line by the line finder and causes a holding potential from ground to be applied via conductor 152 and the control wiper to the line circuit of the calling line. The holding ground potential is retained on the line circuit during the period of the call.

The connector 160 includes Strowger mechanism 180 which is substantially identical to Strowger mechanism 140 having line and control wipers and a bank of contact sets. Contact sets 181 and 182 are illustrated. Additionally the connector includes the reverse battery relay R161 and the line relay R162 and the test relay R163. When the calling line is seized by the finder-connector link the line relay R162 operates to prepare the connector for completing the call to the called line and when the called party answers the reverse battery relay operates to reverse the polarity of the calling line in order to facilitate control functions at the calling terminal in a manner well known in the art. The test relay includes a winding connected between the control wiper and battery potential (here shown as —48 volts) which tests the called line for idle or busy condition. When the called line is idle, battery potential is returned to the winding thereby preventing the relay from operating and causing a holding potential from ground to be returned to the called line via conductor 164 and the control wiper. When the called line is busy ground potential is returned to the winding causing the test relay to operate, whereby a busy indication is returned to the calling line.

The distributor 170 includes a test relay R171 of the marginally operated type which is connected between a source of —48 volts and start conductors extending to the line circuits 110 and 210. The relay R171 is operated in response to a ground potential applied thereto over a start conductor to cause a link to search for a calling line in a manner well understood in the telephone art.

In the telephone system, and by the way of illustration, each subscriber station is designated by a two digit directory number individual thereto. The first digit indicates the vertical bank level and the second digit indicates the contact set in the bank level of the connector contact bank terminating the designated subscriber line.

The mode of operation of the apparatus incorporated in the telephone system will be better understood from the following description of calls made between the subscriber stations through apparatus including the individually associated line circuits.

An understanding of the general operation of the telephone system in accordance with the invention may be had by tracing a call initiated at subscriber station A and directed to the subscriber station B. When the receiver at station A is removed from the hook the associated line circuit 110 is controlled, in a manner described in detail hereinafter, to mark the control contact 142C in contact set 142 and the level contact 143A in mechanism 143 as calling and to cause distributor 170 to assign an idle finder connector link such as, for example, that illustrated comprising the finder 150 and the connector 160, to find the calling line. When the finder finds the calling subscriber line 101 the line circuit 110 is further controlled to mark the subscriber line 101 as busy at control contact 181C in contact set 181 to the connector 160 and the other connectors having access thereto and to dismiss the distributor 170. Thereafter the connector 160 responds to the directory number dialed at the subscriber station A and moves the wipers thereof to the contact set 182 of the subscriber line 201 designated by the called directory number. The connector 160 completes the connection to the subscriber line 201 and the line circuit 210 associated therewith. When the line 201 is found to be busy a busy signal is returned over the calling line 101 to the station A. When the line 201 is found to be idle the connector rings the party at station B and controls the line circuit 210 so as to mark the line 201 as busy at the control contact 141C in the contact set 141 to the finders 150 etc. Whether or not the party at station B answers, all of the operative circuits cannot be finally released until the party at station A returns his receiver to the hook and disconnects.

With specific reference to the line circuit, the line circuits 110 and 210 shown are identical, therefore any explanation made with reference to one line circuit is understood to apply also to the other. Each line circuit is connected to its respective subscriber line at the positive and negative line conductors thereat through which connections the line circuit is controlled in response to the initiation of a call. Further, each line circuit provides a finder control conductor which indicates when the line is calling and a connector control conductor which indicates whether the line is idle or busy. A source of power having three terminals operates the line circuit and the three terminals are respectively the reference voltage (ground potential), the low voltage (−48 volts) and the high voltage (−60 volts). The operating principles and other features of the line circuit will be understood from the following operational study of the circuit in a telephone system.

Considering first the condition when the subscriber line 101 is idle, the positive line conductor is held at the reference potential through contacts 116 and the negative line conductor is held at the high potential from the high voltage terminal through the biasing resistor 126, bus 130 and contacts 115. The high potential on bus 130 biases the transistors T120 and T121 nonconducting at the base connections thereof whereby the first winding of the line relay R114 is maintained at the reference potential by a connection thereto through the control resistor 123 from the reference voltage terminal and the second winding is maintained at the low potential by a connection thereto through the control resistor 119 from the low voltage terminal of the power source. A control conductor 129 extending to the control 142C in contact set 142 in the finder bank is connected to the first winding through a poled diode 112 and to the second winding through a poled diode 111. As the series impedance of the resistor 123 and the first winding is made to be substantially less than the series impedance of the resistor 119 and the second winding, the finder control conductor 129 is marked so that the marginal test relay R151 in finder 150 making contact therewith through the control wiper and the contact 142C effectively finds the reference potential on the control conductor so that the subscriber line 101 is indicated as non-calling. A control conductor 128 extending to the control contact 181C in contact set 181 of the connector bank is connected to the second winding of the relay R114 so that the subscriber line is indicated as idle to a connector by the low potential thereon and whereby the test relay R163 in the connector 160 is not operated when the connector makes contact with the subscriber line.

When the subscriber at station A initiates a call a loop circuit is completed extending from −60 volts to 0 volts over a path including the resistor 126, the bus 130, the contacts 115, the line 101, the station A, and the contacts 116. The resistance of the subscriber line and of the resistor 126 are adjusted so that when the loop circuit is completed the negative line voltage is raised from −60 volts to a value somewhat in the range of 0 and −10 volts. The base electrodes of the transistors T120 and T121 are raised to substantially the same potential thereby causing a small amount of electric current flow through resistor 122, the base electrode and the emitter electrode of T121 to the low voltage terminal (−48 volts) of the power source. Due to transistor action the small current flow through the base results in a much larger current flow in the collector circuit of the transistor T121 which includes resistor 123. This large current flow changes the potential of the collector electrode from ground to the low potential (−48 volts). This new collector potential is impressed upon the control conductor 129 through the upper winding of relay R114 and diode 112, thus marking the line as calling at the control contact 142C.

At the same time the base of transistor T120 is raised to the potential of the negative line conductor causing the emitter thereof to follow to the same potential, the transistor T120 being connected in a "cathode follower" arrangement. Thus the negative line conductor potential (substantially the reference potential) is impressed through the diode 117 onto the start conductor 127 which extends to the distributor 170 and thence to the contact 143A in the vertical level contacts 143. In addition the negative line conductor potential is impressed onto the control conductor 128 extending to the control contact 181C of contact set 181 in the connector bank 180, in a path including the second winding of relay R114 and the parallel connected diode 113 whereby the line 101 is indicated as busy to the connector 160, etc. The diode 113 provides a low impedance shunt path around the second winding of the relay R114 during the call initiating interval so that in the event the connector 160 etc. makes contact with the connector control conductor 128 during this interval the test relay R163 therein will draw its energizing current through the path including the diode 113 rather than the path including the second winding of the relay R114 thereby insuring the line relay R114 against false operation. It should be noted that as the potential marked on the control conductor 128 is substantially the reference potential (actually in a range from 0 to −10 volts) the test relay R163 in the connector should be adapted to respond to a marking potential in the designated range.

The negative line conductor potential extended to the start conductor 127 causes the relay R171 in the distributor 170 to operate whereby the distributor 170 selects the idle finder 150 to search for the calling line. The finder 150 searches first to find the vertical level by means of the marked contact 143A in vertical level mechanism 143 and thereafter searches in the contact sets at that level to find the control contact 142C marked by the low potential (−48 volts).

When the finder 150 of the link circuit makes contact with the contact set of the calling line the relay R151 in the finder 150 is operated thereby causing a holding ground potential to be returned to the control conductor 129 over conductor 152 in a manner as described heretofore. The holding ground potential is applied to the first winding of the relay R114 through the diode 112 and is further applied to the diode 111 which is connected to the second winding of R114 and to the control conductor 128. The upper winding of relay R114 is energized and the relay operated thereby opening the contacts 115 and 116 and opening the loop extending from −60 volts to ground potential. The transistors T121 and T120 are cut off instantly causing the potential on the collector electrode on the transistor T121 to increase from the low potential to ground potential and changing the potential on the emitter electrode of the transistor T120 from substantially ground potential to the low potential (−48 volts). The upper winding of relay R114 is deenergized because of the change in potential thereon and the lower winding energized by the finder holding ground potential in a path extending through the diode 111, the second winding and the resistor 119 to the low voltage terminal of the power source. The resistance of the second winding of the relay R114 is several times greater than that of the resistor 119 whereby the potential at the emitter electrode of the transistor T120 is held substantially at the low potential causing the start signal to be removed from the start conductor 127. Further the connector control conductor 128 is marked as busy by the holding ground potential applied thereto through the diode 111.

Additionally, at the time when the contacts 115 and 116 are opened, thereby interrupting the connections from the reference potential and high potentials from the line, a circuit is closed through the windings of line relay R162 in the connector 160 and the subscriber line 101 and the station A causing the relay R162 to operate and to prepare the connector for completing the call.

At this time the link circuit including the finder 150 and the connector 160 has been connected with the calling subscriber line 101, and the distributor 170 has been released from the circuit. The connector is now in a condition to receive the dialing pulses corresponding to the directory number of the called station.

In response to the dialing of the numbers designating the station B, the connector 160 completes a connection to the contact bank 180 at the contact set 182. When the line 201 is busy the connector control conductor 228 in line circuit 210 is marked by the holding ground potential applied thereto by the busying line finder as described with reference to line finder 110. The test relay R163, in the connector is operated causing a busy tone to be returned to the calling line 101 in a manner well known in the art. The established connections is interrupted thereafter when the calling party returns his instrument to the hook.

Assuming that subscriber line 201 is idle, the control conductor 228 is marked by the low potential whereupon the relay R163 in the connector 160 is not operated and holding ground potential is applied to the control conductor 228 through conductor 164 and the contact 182C. Thereatfer the relay R214 is operated over a path extending from the control conductor 228 through the second winding of relay R214 and the resistor 219 to low voltage terminal (−48 volts) of the power source. The operation of the relay R214 opens the contacts 215 and 216 interrupting the connections from the high voltage and reference potential terminals of the source to the line 201 thereby preventing the line from initiating a call. At this time the line 201 has been seized, the line circuit 210 operated to prevent the line from being marked as calling to the finders and the connector prepared to ring the station on the called line.

Thereafter the subscriber station B is rung and assuming that the party at station B does not answer, the line 201 and link circuit may be released by the party at calling station A replacing his receiver on the hook thereby opening the loop extending to line 201 and station B. In particular, when the party at substation A opens the loop, the relay R162 in the connector 160 is restored and the connections from the link circuit to the line circuits are knocked down whereby holding ground is removed from the line circuits. In the line circuits 110 and 210 the line relays R114 and R214, respectively, are restored thereby closing the contacts 115 and 116, and the contacts 215 and 216, respectively, to reconnect the ground and the low potentials to the individual subscriber lines. The line circuits are then idle and in a condition to initiate or receive calls.

Assuming that the party at station B answers, the reverse relay R161 is operated and a talking connection completed between the lines 101 and 201 through the capacitors 165 and 166. Assuming that the party at the called station B hangs up first the talking connection is interrupted but as the line relay R162 is retained operated none of the connected equipment is released. The link circuit is released and line circuits restored in a manner described above when the party at station A replaces his receiver on the hook thereby restoring the relay R162 in the connector.

Assuming that the call has been completed from subscriber station A to subscriber station B and the subscriber at station A hangs up first the link circuit is released, as described, and the line circuits 110 and 210 restored and the individual subscriber lines prepared to initiate or to receive calls. If at this time the party at subscriber station B has not returned his receiver to the hook the line circuit 210 will act to initiate a connection to a link circuit as if the line 201 were calling and in a manner as described above with reference to a call initiated on the subscriber line 101.

Each of the line circuits 110 and 210 also includes a call counter circuit which makes a record of an initiated call at the calling line circuit when the call is completed. In the line circuit 110 the call counter circuit comprises the diode 124 and the meter apparatus 125 which are connected in series between finder control conductor 129 and the reference potential terminal of the power source. In the line circuit 210 the counter circuit comprises the diode 224 and the meter apparatus 225 connected in series between finder control conductor 229 and the reference potential terminal. As mentioned above, these circuits are operated only when the line associated with the respective line circuits is the call initiating line and that call is completed, at which time, the connector 160 causes a voltage pulse which is poled positive with respect to the reference potential to be returned to the finder control conductor 129 by means of the control wiper of the line finder 150. The positive voltage pulse causes the diode in the counter circuit to conduct thereby operating the associated meter and making a record that the call initiated at that line was completed.

The transistors used in the line circuit in accordance with the invention are preferably of the n-p-n semiconductor junction type. It is understood that other types of transistors may be used in which case the potentials applied and the polarity of the diodes used must be changed accordingly. In any event, it is clear that the above described embodiment is merely illustrative of the principles of the invention and that others skilled in the art may construct other modified embodiments without departing from the spirit and scope of the invention.

What is claimed is:

1. In a telephone system including a subscriber line provided with a pair of line conductors and first and second control conductors, a source of power supply provided with a reference voltage terminal and a low voltage terminal and a high voltage terminal, a plurality of outgoing switches having access to said subscriber line via said line conductors and said first control conductor, the marking of said first control conductor by said low potential identifies said subscriber line as calling to said outgoing switches and the marking of said first control conductor by said reference potential identifies said subscriber line as non-calling to said outgoing switches, any one of said outgoing switches seizing said subscriber line and impressing said reference potential upon said first control conductor as a holding potential, and a plurality of incoming switches having access to said subscriber line via said line conductors and said second control conductor, the marking of said second control conductor by said low potential identifies said subscriber line as idle to said incoming switches and the marking of said second control conductor by said reference potential identifies said subscriber line as busy to said incoming switches, any one of said incoming switches seizing said subscriber line and impressing said reference potential upon said second control conductor as a holding potential; a line circuit associated with said subscriber line and comprising a relay provided with first and second windings, a first supply connection from said reference voltage terminal to one of said line conductors, a biasing resistor, a bus, a second supply connection from said high voltage terminal via said biasing resistor and said bus to the other of said line conductors, a first control resistor, a first transistor provided with a base connected to said bus and a collector connected via said first control resistor to said reference voltage terminal and an emitter connected to said low voltage terminal, a second control resistor, a second transistor provided with a base connected to said bus and a collector connected to said reference voltage terminal and an emitter connected via said second control resistor to said low voltage terminal, a connection from said first control conductor via said first winding to the junction between said first control resistor and the collector of said first transistor, whereby said first control conductor is marked by said reference potential when said subscriber line is non-calling, a connection from said second control conductor via said second winding to the junction between said second control resistor and the emitter of said second transistor, whereby said second control conductor is marked by said low potential when said subscriber line is idle, means responsive to the initiation of a call upon said line conductors for completing a circuit via said bus and said biasing resistor, whereby said transistors are rendered conductive, the conduction of said first transistor marking said first control conductor via said first winding with said low potential, the conduction of said second transistor applying said reference potential via said second winding to said second control conductor, means responsive to the conduction of said second transistor for operating one of said outgoing switches to seize said subscriber line, said first winding being energized via said first control conductor by the application of said reference potential thereto incident to seizure of said subscriber line by said one outgoing switch so as to operate said relay, means responsive to operation of said relay for interrupting said first and second supply connections so as to render non-conducting said first and second transistors, means including a diode interconnecting said first and second control conductors and responsive to said reference potential impressed upon said first control conductor for applying said reference potential to said second control conductor, and means responsive to the application of said reference potential upon said second control conductor incident to seizure of said subscriber line by any one of said incoming switches for completing a circuit via said second winding so as to operate said relay.

2. In a telephone system including a subscriber line provided with a pair of line conductors and first and second control conductors, a source of power supply provided with a reference voltage terminal and a low voltage terminal and a high voltage terminal, a plurality of outgoing switches having access to said subscriber line via said line conductors and said first control conductor, the marking of said first control conductor by said low potential identifies said subscriber line as calling to said outgoing switches and the marking of said first control conductor by said reference potential identifies said subscriber line as non-calling to said outgoing switches, any one of said outgoing switches seizing said subscriber line and impressing said reference potential upon said first control conductor as a holding potential, and a plurality of incoming switches having access to said subscriber line via said line conductor and said second control conductor, the marking of said second control conductor by said low potential identifies said subscriber line as idle to said incoming switches and the marking of said second control conductor by said reference potential identifies said subscriber line as busy to said incoming switches, any one of said incoming switches seizing said subscriber line and impressing said reference potential upon said second control conductor as a holding potential; a line circuit associated with said subscriber line and comprising a relay provided with first and second windings, a first supply connection from said reference voltage terminal to one of said line conductors, a biasing resistor, a bus, a second supply connection from said high voltage terminal via said biasing resistor and said bus to the other of said line conductors, a first control resistor, a first transistor provided with a base connected to said bus and a collector connected via said first control resistor to said reference voltage terminal and an emitter connected to said low voltage terminal, a second control resistor, a second transistor provided with a base connected to said bus and a collector connected to said reference voltage terminal and an emitter connected via said second control resistor to said low voltage terminal, a connection from said first control conductor via said first winding to the junction between said first control resistor and the collector of said first transistor, whereby said first control conductor is marked by said reference potential when said subscriber line is non-calling, a connection from said second control conductor via said second winding to the junction between said second control resistor and the emitter of said second transistor, whereby said second control conductor is marked by said low potential when said subscriber line is idle, means responsive to the initiation of a call upon said line conductors for completing a circuit via said bus and said biasing resistor, whereby said transistors are rendered conductive, the conduction of said first transistor marking said first control conductor via said first winding with said low potential, the conduction of said second transistor applying said reference potential via said second winding to said second control conductor, means responsive to the conduction of said second transistor for operating one of said outgoing switches to seize said subscriber line, said first winding being energized via said first control conductor by the application of said reference potential thereto incident to seizure of said subscriber line by said one outgoing switch so as to operate said relay, means responsive to operation of said relay for interrupting said first and second supply connections so as to render non-conducting said first and second transistors, and means including a diode interconnecting said first and second control conductors and responsive to said reference potential impressed upon said first control conductor for applying said reference potential to said second control conductor.

3. In a telephone system including a subscriber line provided with a pair of line conductors and first and second control conductors, a source of power supply provided with a reference voltage terminal and a low voltage terminal and a high voltage terminal, a plurality of outgoing switches having access to said subscriber line via said line conductors and said first control conductor, the marking of said first control conductor by said low potential indicates said subscriber line as calling to said outgoing switches and the marking of said first control conductor by said reference potential identifies said subscriber line as non-calling to said outgoing switches, any one of said outgoing switches seizing said subscriber line and impressing said reference potential upon said first control conductor as a holding potential, and a plurality of incoming switches having access to said subscriber line via said line conductor and said second control conductor, the marking of said second control conductor by said low potential identifies said subscriber line as idle to said incoming switches and the marking of said second control conductor by said reference potential identifies said subscriber line as busy to said incoming switches, any one of said incoming switches seizing said subscriber line and impressing said reference potential upon said second control conductor as a holding potential; a line circuit associated with said subscriber line and comprising a relay provided with first and second windings, a first supply connection from said reference voltage terminal to one of said line conductors, a biasing resistor, a bus, a second supply connection from said high voltage terminal via said biasing resistor and said bus to the other of said line conductors, a first control resistor, a first transistor provided with a base connected to said bus and a collector connected via said first control resistor to said reference voltage terminal and an emitter connected to said low voltage terminal, a second control resistor, a second transistor provided with a base connected to said bus and a collector connected to said reference voltage terminal and an emitter connected via said second control resistor to said low voltage terminal, a connection from said first control conductor via said first winding to the junction between said first control resistor and the collector of said first transistor, whereby said first control conductor is marked by said reference potential when said subscriber line is non-calling, a connection from said second control conductor via said second winding to the junction between said second control resistor and the emitter of said second transistor, whereby said second control conductor is marked by said low potential when said subscriber line is idle, means responsive to the application of said reference potential upon said second control conductor incident to seizure of said subscriber line by any one of said incoming switches for completing a circuit via said second winding so as to operate said relay, and means responsive to operation of said relay for interrupting said first and second supply connections.

4. In a telephone system including a subscriber line provided with a pair of line conductors and first and second control conductors, a source of power supply provided with a reference voltage terminal and a low voltage terminal and a high voltage terminal, a plurality of outgoing switches having access to said subscriber line via said line conductors and said first control conductor, the marking of said first control conductor by said low potential identifies said subscriber line as calling to said outgoing switches and the marking of said first control conductor by said reference potential identifies said subscriber line as non-calling to said outgoing switches, any one of said outgoing switches seizing said subscriber line and impressing said reference potential upon said first control conductor as a holding potential, and a plurality of incoming switches having access to said subscriber line via said line conductors and said second control conductor, the marking of said second control conductor by said low potential identifies said subscriber line as idle to said incoming switches and the marking of said second control conductor by said reference potential identifies said subscriber line as busy to said incoming switches, any one of said incoming switches seizing said subscriber line and impressing said reference potential upon said second control conductor as a holding potential, a start conductor, and means responsive to the application of said reference potential upon said start conductor for operating one of said outgoing switches to seize said subscriber line; a line circuit associated with said subscriber line and comprising a relay provided with first and second windings, a first supply connection from said reference voltage terminal to one of said line conductors, a biasing resistor, a bus, a second supply connection from said high voltage terminal via said biasing resistor and said bus to the other of said line conductors, a first control resistor, a first transistor provided with a base connected to said bus and a collector connected via said first control resistor to said reference voltage terminal and an emitter connected to said low voltage terminal, a second control resistor, a second transistor provided with a base connected to said bus and a collector connected to said reference voltage terminal and an emitter connected via said second control resistor to said low voltage terminal, a connection from said first control conductor via said first winding to the junction between said first control resistor and the collector of said first transistor, whereby said first control conductor is marked by said reference potential when said subscriber line is non-calling, a connection from said second control conductor via said second winding to the junction between said second control resistor and the emitter of said second transistor, whereby said second control conductor is marked by said low potential when said subscriber line is idle, means responsive to the initiation of a call upon said line conductors for completing a circuit via said bus and said biasing resistor, whereby said transistors are rendered conductive, the conduction of said first transistor marking said first control conductor via said first winding with said low potential, the conduction of said second transistor applying said reference potential via said second winding to said second control conductor, means including a diode interconnecting said start conductor and the junction between said second control resistor and the emitter of said second transistor and responsive to the conduction of said second transistor for applying said reference potential to said start conductor, said first winding being energized via said first control conductor by the application of said reference potential thereto incident to seizure of said subscriber line by said one outgoing switch so as to operate said relay, means responsive to operation of said relay for interrupting said first and second supply connections so as to render non-conducting said first and second transistors, means including a second diode interconnecting said first and second control conductors and responsive to said reference potential impressed upon said first control conductor for applying said reference potential to said second control conductor, and means responsive to the application of said reference potential upon said second control conductor incident to seizure of said subscriber line by any one of said incoming switches for completing a circuit via said second winding so as to operate said relay.

5. In a telephone system including a subscriber line provided with a pair of line conductors and first and second control conductors, a source of power supply provided with a reference voltage terminal and a low voltage terminal and a high voltage terminal, a plurality of outgoing switches having access to said subscriber line via said line conductors and said first control conductor, the marking of said first control conductor by said low potential identifies said subscriber line as calling to said outgoing switches and the marking of said first control conductor by said reference potential identifies said subscriber line as non-calling to said outgoing switches, any one of said outgoing switches seizing said subscriber line and impressing said reference potential upon said first control conductor as a holding potential, and a plurality of incoming switches having access to said subscriber line via said line conductors and said second control conductor, the marking of said second control conductor by said low potential identifies said subscriber line as idle to said incoming switches and the marking of said second control conductor by said reference potential identifies said subscriber line as busy to said incoming switches, any one of said incoming switches seizing said subscriber line and impressing said reference potential upon said second control conductor as a holding potential; a line circuit associated with said subscriber line and comprising a relay provided with first and second windings, a first supply connection from said reference voltage terminal to one of said line conductors, a biasing resistor, a bus, a second supply connection from said high voltage terminal via said biasing resistor and said bus to the other of said line conductors, a first control resistor, a first transistor provided with a base connected to said bus and a collector connected via said first control resistor to said reference voltage terminal and an emitter connected to said low voltage terminal, a second control resistor, a second transistor provided with a base connected to said bus and a collector connected to said reference voltage terminal and an emitter connected via said second control resistor to said low voltage terminal, a connection from said first control conductor via said first winding to the junction between said first control resistor and the collector of said first transistor, whereby said first control conductor is marked by said reference potential when said subscriber line is non-calling, a connection from said second control conductor via said second winding to the junction between said second control resistor and the emitter of said second transistor, whereby said second control conductor is marked by said low potential when said subscriber line is idle, a first diode interconnecting said second control conductor and the junction between said second control resistor and the emitter of said second transistor and poled to impress upon said second control conductor said reference potential, means responsive to the initiation of a call upon said line conductors for completing a circuit via said bus and said biasing resistor, whereby said transistors are rendered conductive, the conduction of said first transistor marking said first control conductor via said first winding with said low potential, the conduction of said second transistor marking said second control conductor via said first diode with said reference potential, means responsive to the conduction of said second transistor for operating one of said outgoing switches to seize said subscriber line, said first winding being energized via said first control conductor by the application of said reference potential thereto incident to seizure of said subscriber line by said one outgoing switch so as to operate said relay, means responsive to operation of said relay for interrupting said first and second supply connections so as to render non-conducting said first and second transistors, means including a second diode interconnecting said first and second control conductors and responsive to said reference potential impressed upon said first control conductor for applying said reference potential to said second control conductor.

6. In a telephone system including a subscriber line provided with a pair of line conductors and first and second control conductors, a source of power supply provided with a reference voltage terminal and a low voltage terminal and a high voltage terminal, a plurality of outgoing switches having access to said subscriber line via said line conductors and said first control conductor, the marking of said first control conductor by said low potential identifies said subscriber line as calling to said outgoing switches and the marking of said first control conductor by said reference potential identifies said subscriber line as non-calling to said outgoing switches, any one of said outgoing switches seizing said subscriber line and impressing said reference potential upon said first control conductor as a holding potential, and a plurality of incoming switches having access to said subscriber line via said line conductors and said second control conductor, the marking of said second control conductor by said low potential identifies said subscriber line as idle to said incoming switches and the marking of said second control conductor by said reference potential identifies said subscriber line as busy to said incoming switches, any one of said incoming switches seizing said subscriber line and impressing said reference potential upon said second control conductor as a holding potential; a line circuit associated with said subscriber line and comprising a relay provided with first and second windings, a first supply connection from said reference voltage terminal to one of said line conductors, a biasing resistor, a bus, a second supply connection from said high voltage terminal via said biasing resistor and said bus to the other of said line conductors, a first control resistor, a first transistor provided with a base connected to said bus and a collector connected via said first control resistor to said reference voltage terminal and an emitter connected to said low voltage terminal, a second control resistor, a second transistor provided with a base connected to said bus and a collector connected to said reference voltage terminal and an emitter connected via said second control resistor to said low voltage terminal, a first and a second diode connected in series opposition and responsive only to said reference voltage applied at the junction of said diodes, a connection from said first control conductor via the junction of said diodes and said first diode and said first winding to the junction between said first control resistor and said first transistor whereby said first control conductor is marked by said reference potential when said subscriber line is non-calling, a connection from said second control conductor via said second winding to the junction between said second control resistor and the emitter of said second transistor, whereby said second control conductor is marked by said low potential when said subscriber line is idle, means responsive to the initiation of a call on said line conductors for completing a circuit via said bus and said biasing resistor, whereby said transistors are rendered conductive, the conduction of said first transistor marking said first control conductor via said first winding and said first diode with said low potential, the conduction of said second transistor applying said reference potential via said second winding to said second control conductor, means responsive to the conduction of said second transistor for operating one of said outgoing switches to seize said subscriber line, said first winding being energized via said first control conductor by the application of said reference potential thereto incident to seizure of said subscriber line by said one outgoing switch so as to operate said relay, means responsive to operation of said relay for interrupting said first and second supply connections so as to render non-conducting said first and second transistors, and a connection from said first control conductor via the junction of said diodes and said second diode to said second control conductor for applying said reference potential impressed on said first control conductor to said second control conductor.

7. In a telephone system including a subscriber line provided with a pair of line conductors and first and second control conductors, a source of power supply provided with a reference voltage terminal and a low voltage terminal and a high voltage terminal, a plurality of outgoing switches having access to said subscriber line via said line conductors and said first control conductor, the marking of said first control conductor by said low potential identifies said subscriber line as calling to said outgoing switches and the marking of said first control conductor by said reference potential identifies said subscriber line as non-calling to said outgoing switches, any one of said outgoing switches seizing said subscriber line and impressing said reference potential upon said first control conductor as a holding potential, and a plurality of incoming switches having access to said subscriber line via said line conductors and said second control conductor by said low potential identifies said subscriber line as idle to said incoming switches and the marking of said second control conductor by said reference potential identifies said subscriber line as busy to said incoming switches, any one of said incoming switches seizing said subscriber line and impressing said reference potential upon said second control conductor as a holding potential, a start conductor, and means responsive to the application of said reference potential upon said start conductor for operating one of said outgoing switches to seize said subscriber line; a line circuit associated with said subscriber line and comprising a relay provided with first and second windings, a first supply connection from said reference voltage terminal to one of said line conductors, a biasing resistor, a bus, a second supply connection from said high voltage terminal via said biasing resistor and said bus to the other of said line conductors, a first control resistor, a first transistor provided with a base connected to said bus and a collector connected via said first control resistor to said reference voltage terminal and an emitter connected to said low voltage terminal, a second control resistor, a second transistor provided with a base connected to said bus and a collector connected to said reference voltage terminal and an emitter connected via said second control resistor to said low voltage terminal, a first and a second diode connected in series opposition and responsive only to said reference voltage applied at the junction of said diodes, a connection from said first control conductor via the junction of said diodes and said first diode and said first winding to the junction between said first control resistor and said first transistor whereby said first control conductor is marked by said reference potential when said subscriber line is non-calling, a connection from said second control conductor via said second winding to the junction between said second control resistor and the emitter of said second transistor, whereby said second control conductor is marked by said low potential when said subscriber line is idle, a third diode interconnecting said second control conductor and the junction between said second control resistor and the emitter of said second transistor and responsive to said reference potential at said junction for applying said reference potential to said second control conductor, means responsive to the initiation of a call upon said line conductors for completing a circuit via said bus and said biasing resistor, whereby said transistors are rendered conductive, the conduction of said first transistor marking said first control conductor via said first winding and said first transistor with said low potential, the conduction of said second transistor marking said second control conductor via said third transistor with said reference potential, means including a fourth diode interconnecting said start conductor and the junction between said second control resistor and the emitter of said second transistor and responsive to the conduction of said second transistor for applying said reference potential to said start conductor, said first winding being energized via said first control conductor by the application of said reference potential thereto incident to seizure of said subscriber line by said one outgoing switch so as to operate said relay, means responsive to operation of said relay for interrupting said first and second supply connections so as to render non-conducting said first and second transistors, a connection from said first control conductor via the junction of said first and second diodes and via said second diode to said second control conductor for applying said reference potential impressed on said first control conductor to said second control conductor whereby said second winding is energized when said relay is operated incident to the seizure of said subscriber line by said one outgoing switch, and means responsive to the application of said reference potential upon said second control conductor incident to seizure of said subscriber line by any one of said incoming switches for completing a circuit via said second winding so as to operate said relay.

8. In a telephone system including a plurality of subscriber lines, and switching apparatus having access to said subscriber lines: the combination comprising a pluraltiy of line circuits respectively associated with said subscriber lines; each of said line circuits including a biasing network operatively connected to said individually associated subscriber line and operative from a normal condition into a calling condition in response to the initiation of a call upon said individually associated subscriber line, and a transistor network operatively connected to said biasing network and operative from a normal condition into a calling condition in response to operation of said biasing network into its calling condition, said transistor network being operative into its calling condition to mark to said switching apparatus said individually associated subscriber line as a calling line and to initiate operation of said switching apparatus to find said marked individually associated calling subscriber line.

9. The telephone system combination set forth in claim 8, wherein said line circuit further includes means responsive to finding of said individually associated subscriber line by said switching apparatus for restoring said biasing network to its normal condition, said transistor network being restored to its normal condition in response to restoration of said biasing network to its normal condition in order to remove said marking to said switching apparatus of said individually associated subscriber line as a calling line.

10. In a telephone system including a plurality of subscriber lines, and outgoing switching apparatus and incoming switching apparatus having access to said subscriber lines: the combination comprising a plurality of line circuits respectively associated with said subscriber lines; each of said line circuits including a biasing network operatively connected to said individually associated subscriber line and operative from a normal condition into a calling condition in response to the initiation of a call upon said individually associated subscriber line, a transistor network operatively connected to said biasing network and operative from a normal condition into a calling condition in response to operation of said biasing network into its calling condition, said transistor network being operative into its calling condition to mark to said outgoing switching apparatus said individually associated subscriber line as a calling line and to mark to said incoming switching apparatus said individually associated subscriber line as a busy line and to initiate operation of said outgoing switching apparatus to find said marked individually associated calling subscriber line, said line circuit further including means responsive to the finding of said individually associated subscriber line by said outgoing switching apparatus for restoring said biasing network to its normal condition and for marking to said incoming switching apparatus said associated subscriber line as a busy line, said transistor network being restored to its normal condition in response to restoration of said biasing network to its normal condition in order to remove the calling line marking applied thereby to said outgoing switching apparatus and the busy marking applied thereby to said incoming switching apparatus.

11. In a telephone system including a subscriber line provided with a pair of line conductors and first and second control conductors, a source of power supply provided with a reference voltage terminal and a low voltage terminal and a high voltage terminal, a plurality of outgoing switches having access to said subscriber line via said line conductors and said first control conductor thereof, the marking of said first control conductor by said low potential identifying said subscriber line as calling to said outgoing switches and the marking of said first control conductor by said reference potential identifying said subscriber line as non-calling to said outgoing switches, any one of said outgoing switches seizing the subscriber line and impressing said reference potential upon said first control conductor as a holding potential, and a plurality of incoming switches having access to said subscriber line via said line conductors and said second control conductor thereof, the marking of said second control conductor by a low potential identifying said subscriber line as idle to said incoming switches, the marking of said second control conductor by said reference potential identifying said subscriber line as busy to said incoming switches, any one of said incoming switches seizing said subscriber line and impressing said reference potential upon said second control conductor as a holding potential, a start conductor, and means responsive to the application of said reference potential upon said start conductor for operating one of the outgoing switches to seize the subscriber line; a line circuit comprising a transistor circuit responsive to the initiation of a call on the subscriber line for applying the low potential to said first control conductor and the reference potential to said second control conductor, whereby said line circuit marks said subscriber line as calling to said outgoing switches and as busy to said incoming switches, and a cutoff relay responsive to the impression of the reference potential upon said first control conductor by any one of said outgoing switches for disabling said transistor circuit and for applying the reference potential to said second control conductor and responsive to the impression of the reference potential upon said second control conductor by any one of said incoming switches for disabling said transistor circuit and for applying the reference potential to said first control conductor.

12. In a telephone system including a line circuit as set forth in claim 11, wherein said transistor circuit responsive to the initiation of a call on said subscriber line applies the reference potential to said start conductor, whereby one of the outgoing switches is caused to seize said subscriber line.

13. In a telephone system including a line circuit as set forth in claim 11, wherein said transistor circuit comprises a first normally nonconductive transistor and a second normally nonconductive transistor and means responsive to the initiation of a call on the subscriber line for rendering said first and second transistors conductive.

References Cited in the file of this patent

UNITED STATES PATENTS

| | | |
|---|---|---|
| 2,715,656 | Andrews | Aug. 16, 1955 |
| 2,731,514 | Oberman | Jan. 17, 1956 |

UNITED STATES PATENT OFFICE

CERTIFICATE OF CORRECTION

Patent No. 2,831,064 April 15, 1958

Alfred H. Faulkner

It is hereby certified that error appears in the printed specification of the above numbered patent requiring correction and that the said Letters Patent should read as corrected below.

Column 12, line 60, after the syllable "tor" and before "by" insert -- , the marking of said second control conductor --.

Signed and sealed this 5th day of August 1958.

(SEAL)
Attest:

KARL H. AXLINE
Attesting Officer

ROBERT C. WATSON
Commissioner of Patents